United States Patent
Christiansen et al.

(10) Patent No.: US 11,448,522 B2
(45) Date of Patent: Sep. 20, 2022

(54) RADIO FREQUENCY COMMUNICATION SYSTEM AND METHOD

(71) Applicant: Kamstrup A/S, Skanderborg (DK)

(72) Inventors: Johnny Dørken Christiansen, Galten (DK); Flemming Hald, Hadsten (DK)

(73) Assignee: Kamstrup A/S, Skanderborg (DK)

(*) Notice: Subject to any disclaimer, the term of this patent is extended or adjusted under 35 U.S.C. 154(b) by 528 days.

(21) Appl. No.: 16/484,839

(22) PCT Filed: Feb. 9, 2018

(86) PCT No.: PCT/EP2018/053258
§ 371 (c)(1),
(2) Date: Aug. 9, 2019

(87) PCT Pub. No.: WO2018/146242
PCT Pub. Date: Aug. 16, 2018

(65) Prior Publication Data
US 2019/0387405 A1  Dec. 19, 2019

(30) Foreign Application Priority Data

Feb. 10, 2017 (EP) .................................... 17155536

(51) Int. Cl.
*H04W 12/10* (2021.01)
*G01D 4/00* (2006.01)
(Continued)

(52) U.S. Cl.
CPC ........... *G01D 4/004* (2013.01); *H04L 63/083* (2013.01); *H04L 63/0876* (2013.01);
(Continued)

(58) Field of Classification Search
None
See application file for complete search history.

(56) References Cited

U.S. PATENT DOCUMENTS

2007/0176789 A1  8/2007  Kim
2007/0257813 A1  11/2007  Vaswani et al.
(Continued)

FOREIGN PATENT DOCUMENTS

CN  105610773 A  5/2016
EP  2088706 A2  8/2009
(Continued)

OTHER PUBLICATIONS

Efficient and Secure Data Aggregation for Smart Metering Networks. Abdullah. IEEE. (Year: 2013).*
(Continued)

*Primary Examiner* — Venkat Perungavoor
(74) *Attorney, Agent, or Firm* — Renner, Otto, Boisselle & Sklar, LLP

(57) ABSTRACT

Method and devices for wirelessly transmitting data packets in a meter reading system, wherein the method comprises generating at the meter device, a first data packet including payload data and a first message authentication code computed based the payload data and associated meter data stored in a memory of the meter device, transmitting the first data packet from the meter device to the receiver, and performing a primary authentication check of the first data packet and verifying the associated meter data at the receiver by recalculating the first message authentication code using the received payload data and current associated meter data stored in a memory of the receiver, as input.

8 Claims, 1 Drawing Sheet

(51) Int. Cl.
*H04W 4/38* (2018.01)
*H04L 9/40* (2022.01)
*H04W 12/106* (2021.01)
*H04W 12/04* (2021.01)
*H04W 60/02* (2009.01)

(52) U.S. Cl.
CPC .............. *H04L 63/123* (2013.01); *H04W 4/38* (2018.02); *H04W 12/106* (2021.01)

(56) References Cited

U.S. PATENT DOCUMENTS

| | | | |
|---|---|---|---|
| 2008/0005558 A1 | 1/2008 | Hadley et al. | |
| 2009/0268909 A1* | 10/2009 | Girao | H04W 12/08 380/259 |
| 2011/0320802 A1* | 12/2011 | Wang | H04L 9/083 713/2 |
| 2013/0179687 A1* | 7/2013 | Falk | H04L 63/06 713/168 |
| 2013/0254896 A1 | 9/2013 | Helmschmidt et al. | |
| 2014/0062761 A1* | 3/2014 | Youn | G01S 13/765 342/125 |
| 2014/0301550 A1* | 10/2014 | Lewis | H04L 9/3226 380/259 |
| 2014/0310524 A1* | 10/2014 | Yamanaka | H04L 9/3242 713/170 |
| 2014/0334383 A1 | 11/2014 | Sakemi et al. | |
| 2015/0381367 A1 | 12/2015 | Zarcone et al. | |
| 2016/0116510 A1* | 4/2016 | Kalous | G07C 9/00571 340/636.1 |
| 2021/0111909 A1* | 4/2021 | Teboulle | G08C 17/02 |
| 2021/0334391 A1* | 10/2021 | Gardner | G06F 13/4282 |

FOREIGN PATENT DOCUMENTS

| | | |
|---|---|---|
| KR | 101326732 B1 | 11/2013 |
| WO | 2013050037 A1 | 4/2013 |

OTHER PUBLICATIONS

Elliptic Curve Digital Signature Algorithm (ECDSA) Certificate Based Authentication Scheme for Advanced Metering Infrastructure. Farooq. IEEE. (Year: 2019).*
Using ID-Based Authentication and Key Agreement Mechanism for Securing Communication in Advanced Metering Infrastructure. Farooq. IEEE. (Year: 2020).*
A novel multi-stage distributed authentication scheme for smart meter communication. Hedge. PeerJ. (Year: 2021).*
A Unified Approach for Compression and Authentication of Smart Meter Reading in AMI. Lee. IEEE. (Year: 2019).*
Design of A Key Establishment Protocol for Smart Home Energy Management System. Li. IEEE. (Year: 2013).*
Development of Digital Water Meter Infrastructure Using Wireless Sensor Networks. Muhendra. AIP. (Year: 2016).*
Securing Metering Infrastructure of Smart Grid: A Machine Learning and Localization Based Key Management Approach. Parvez. MDPI. (Year: 2016).*
Performance analysis of smart metering for smart grid: An overview. Sharma. Elsevier. (Year: 2015).*
Real-Time Measurement of Grid Connected Solar Panels Based on Wireless Sensors Network. Syafii. IEEE. (Year: 2016).*
Tire Pressure Monitoring System Using Wireless Communication. Vlshnoi. IJRMS. (Year: 2015).*
CN 105323074. English Translation. (Year: 2018).*
CN110418302. English Translation. (Year: 2019).*
CN 110536259. English Translation. (Year: 2019).*
Communication systems for and remote reading of meters—Part 3: Dedicated application layer; European Committee for Standardization; National Institute of Standards and Technology; May 2013; pp. 1-151.
Open Metering System Specification; OMS Group; Jan. 27, 2014; vol. 2, No. 4.0.02; pp. 1-89.
Open Metering System Specification; OMS Group; Jan. 24, 2014; Annex N to vol. 2, No. 4.0.02; pp. 1-47.
Cyrill Brunschwiler et al.; Wireless M-Bus Security Whitepaper Black Hat USA 2013; Compass Security; Jun. 30, 2013; pp. 1-70.
Elena Dubrova et al.; Cryptographically Secure CRC for Lightweight Message Authentication; IACR Cryptology; Jan. 15, 2015; pp. 1-12.
Notice of Use and Disclosure; LoRa Alliance; 2015; pp. 1-82.
LoRaWAN? What is it? A technical overview of LoRa® and LoRaWAN?; Technical Marketing Workgroup 1.0 LoRa Alliance; Nov. 2015; pp. 1-20.
Mark N. Wegman et al.; New Hash Functions and Their Use in Authentication and Set Equality; Journal of computer and system sciences; 1981; vol. 22, No. 3; pp. 265-279.
Shahram Bakhtiari Bakhtiari Hafi Lang; Analysis and design of message authentication codes; University of Wollongong Thesis Collections; 1998; pp. 1-160.
Computer Data Authentication; U.S. Department of Commerce/ National Bureau of Standards; Federal Information Processing Standards Publication; May 30, 1985; pp. 1-12.
John R. Black, Jr.; Message Authentication Codes; Dissertation; Office of Graduate Studies of the University of California Davis; 2000; pp. 1-126.
Vincent Rumen et al.; Specification for the Advanced Encryption Standard (AES); Federal Information Processing Standards Publication; Publication 197; Nov. 26, 2001; pp. 1-51.
Douglas R. Stinson; Cryptography: Theory and Practice; Discrete Mathematics and Its Applications; Third Edition; 2005; pp. 1-611.
Jh Song; The AES-CMAC Algorithm—Request for Comments: 4493; Network Working Group; Jun. 2006; pp. 1-20.
Communication of a notice of opposition dated Aug. 26, 2021, for corresponding European Patent Application No. 18703027.5.
International Search Report and Written Opinion of corresponding International Patent Application PCT/EP2018/053258 dated Mar. 9, 2018.
Muhammad Daniel Hafiz Abdullah et al.; "Efficient and secure data aggregation for smart metering networks", Intelligent Sensors, Sensor Networks and Information Processing, 2013 IEEE Eighth International Conference On, IEEE, Apr. 2, 2013 (Apr. 2, 2013), pp. 71-76.

* cited by examiner

RADIO FREQUENCY COMMUNICATION SYSTEM AND METHOD

This application is a national phase of International Application No. PCT/EP2018/053258 filed Feb. 9, 2018 and published in the English language, which is an International Application of and claims benefit of priority to Patent Application No. EP 17155536.0, filed on Feb. 10, 2017. The disclosures of the above-referenced applications are hereby expressly incorporated by reference in their entireties.

FIELD OF THE INVENTION

The present invention relates to a radio frequency communication system and method for wirelessly transmitting data packets between two communication nodes of a communication network. More specifically the invention relates to an authenticated encryption scheme for safeguarding validity of transmitted data.

BACKGROUND OF THE INVENTION

Automatic meter reading (AMR) systems and advanced meter infrastructure (AMI) systems are generally known in the art. Utility companies use such systems to read and monitor consumption meters remotely, typically using radio frequency (RF) communication. AMR and AMI systems, commonly known as meter reading systems, increase the efficiency and accuracy of collecting readings and managing customer billing.

AMR systems generally use a mobile RF communication network for collecting meter readings and data, whereas AMI systems use a fixed RF communication network. Especially in AMI systems there may be multiple intermediate collectors located throughout a larger geographic area, each collector in turn communicating with a central back end system, for example by using a wide area network (WAN) or other suitable communication infrastructure. An AMI system may also utilize a system of repeaters or relay devices that expand the coverage area for each reader by forwarding meter readings and data. In a mobile network AMR environment, a handheld, vehicle-mounted, or otherwise mobile reader device with RF communication capabilities is used to collect data from meter devices as the mobile reader is moved from place to place.

A metering system for metering the consumption of a utility may include meter devices in the form of smart meters provided with communication devices for transmitting and receiving RF signals. The communication devices may be configured to periodically transmit data packets including data representing multiple meter readings and other meter data as a function of time. Such data packets are processed, transmitted and revised by the receiver device according to a communication protocol.

Meter devices are typically battery-powered, and consequently have a finite amount of energy available for their service cycle. Because the service cycle for meter devices is typically 10-20 years, to reduce cost associated with meter exchange or battery replacement, energy conservation is a major design criterion. For utility meters having electrical mains available as a power source, energy conservation related to communications may also be desirable.

As radio packet transmission accounts for a substantial portion of the energy usage in meter devices, more efficient transmission and reception can have a significant impact on the energy use, i.e. battery lifetime of a meter device. Thus, if the power used for transmitting data packets can be reduced, this will have a positive effect on the total power budget of the meter device. One way of reducing transmission power is by reducing the amount of data transmitted and the data packet length. However, transmission power is often closely related to transmission quality and reception reliability, which is also of great importance. Common grounds for low transmission quality and reliability is path loss, collision, congestion, etc.

Another important design criterion for utility meter communications systems is communication security. A communication system must include measures to ensure that data packets transmitted between meter devices, repeaters, collectors and the backend system are authentic and have not been tampered with during transmission. Additionally, in many jurisdictions consumption data is considered personal information. Interception of such data must therefore be prevented to ensure that unauthorized parties cannot access data.

Meter readings and other data, such as alerts or sensor data, may be transmitted in the form of data packets from the meter devices to the backend system, and the backend system may transmit data packets including commands or updates, to the meter devices. Reliability has to do with the robustness of the communication system and the ability of the system to successfully transmit a data packet from the sender, via possible intermediate devices, to the correct receiver. If a packet does not successfully reach the receiver, it is necessary to retransmit the packet, which is undesirable.

A need thus exists for an improved communication system wherein the transmission power is reduced without compromising transmission quality, reception reliability and communication security.

OBJECT OF THE INVENTION

It is an object of the present invention to provide an alternative to the prior art. In particular, it may be seen as an object of the present invention to provide a method for providing secure and effective communication in a smart grid system by reducing the amount of data needed to be transmitted.

SUMMARY OF THE INVENTION

Thus, the above described object and several other objects are intended to be obtained in a first aspect of the invention by providing a method, for wirelessly transmitting data packets from a meter device to a receiver of a meter reading system, the method comprising the steps of: generating at the meter device, a first data packet (DP1) including consumption data (CD) as payload data and a first message authentication code (MAC1) computed based on a MAC-algorithm using as input the payload data (PD), and associated meter data (AMD) and a data encryption key (DEK) stored in a memory of the meter device; transmitting the first data packet (DP1) from the meter device to the receiver; performing a primary authentication check of the first data packet (DP1) at the receiver by recalculating the first message authentication code using the MAC-algorithm with the received payload data (PD), the data encryption key (DEK) stored in a memory of the receiver, and current associated meter data (CAMD) stored in a memory of the receiver, as input; and accepting the first data packet if it is verified as authentic.

In this regard, a receiver may be construed as a standalone device such as a collector- or concentrator of a meter reading system or as an integrated part of a back end system.

Transmission of the data packets to the receiver may either be directly or indirectly via a number or relay devices for relaying, retransmitting or forwarding the data packet to the backend system.

Additionally, the meter device may by any kind of device for metering, measuring or sensing a parameter related to the device itself or to some ambient condition or change in ambient condition of the device. The meter device could include means for measuring particle level or the presence of particles or chemical connection in a substance such as a fluid or in the surrounding air.

By applying the above defined communication method, the total packet length may be substantially reduced, as the payload of the packet is reduced by omitting the associated meter data. However, as the associated meter data used by the meter must be known to the receiver to correctly infer the transmitted consumption data from the information contained in a data packet, the defined communication method allows the receiver to verify the associated meter data.

Moreover, the step of performing the primary authentication of the first data packet may further de considered to include an actual verification of the current associated meter data stored in a memory of the receiver as the first message authentication code is recalculated using the associated meter data stored by the receiver.

Furthermore, the payload data (PD) may be constituted by the consumption data (CD). The consumption data thus being the only payload in the data packet. The remaining data packet being constituted by overhead data, which may include data to support the type of protocol, employed by the communication system and redundancy check data to support detection, and optionally the correction, of errors caused to the data packet during transmission between nodes]

Additionally, if the first data packet is not accepted during the primary authentication check of the above described method, the method may further comprises the steps of: performing a secondary authentication check of the first data packet (DP1) at the receiver by recalculating the first message authentication code using the received payload data PD, the data encryption key DEK and a plurality of different sets of associated meter data (AAMD) stored in the memory of the receiver, as input for the MAC-algorithm; considering the first data packet as potentially authentic and storing the first data packet in a cache memory of the receiver, if one of the different sets of associated meter data results in a match for the first message authentication code; generating a second data packet (DP2) at the meter device, including consumption data (CD2) as payload data (PD2) and a second message authentication code (MAC2), and transmitting the second data packet (DP2) from the meter device to the receiver; performing tertiary authentication check of the second data packet (DP2) at the receiver by recalculating the second message authentication code using the MAC-algorithm with the payload data (PD2), the data encryption key (DEK) and the associated meter data identified during the secondary authentication check, as input; accepting the first and the second data packets as authentic if the recalculation results in a match for the second authentication code.

Moreover, the associated meter data may reflect configuration parameters of the meter device, such as unit of measurement, data resolution or an indication of the memory register to be used as input for the consumption data. Additionally, the current associated data (CAMD) may be updated if the first and the second data packets are accepted as authentic during the tertiary authentication check. In addition, the current associated data (CAMD) may initially be inputted into the cache memory of the receiver in connection with the initial installation of the meter device our in connection with re-calibration of the meter device. Furthermore, the payload data (PD) and the message authentication codes of the data packets may be encrypted by the meter device before transmission and subsequently decrypted by the receiver.

According to a second aspect of the invention the above described object and several other objects are intended to be obtained by a meter device (12) for measuring the flow rate of a fluid or for sensing another parameter, the meter device comprising: a processor configured to compute consumption data based on the flow rate measurements or the sensed parameter; a transmitter for transmitting data packets via radio frequency communication; wherein the processor is further configured to perform the steps of generating and transmitting data packets (DP1, DP2) according to the above described method. Further, the processor may be part of a processing circuit or a processor and it may be implemented using discrete components, as an integrated circuit or as an ASIC.

According to a third aspect of the invention the above described object and several other objects are intended to be obtained by a receiver (14) for receiving a data packet transmitted by a meter device, the receiver comprising means for executing the steps of the method described in any of the claims 1-6 related to reception of data packets and checking of authentication of the received data packets.

According to a fourth aspect of the invention the above described object and several other objects are intended to be obtained by a radio communication protocol comprising instructions to cause the meter device and the receiver of claims 7 and 8 to execute the steps of the method of claim 1.

The above-described MAC-algorithm may be based on various error detection schemes such as cyclic redundancy checks (CRCs), checksum, or hamming code. MAC algorithms based on cryptographic methods in general may be used as well e.g. algorithms such as CMAC or CBC-MAC based on the AES algorithm or other adequate algorithms. The message authentication code (MAC) may also be referred to as a message integrity code (MIC).

Furthermore, as stated above, the payload data (PD) may be constituted by the consumption data (CD). The consumption data thus being the only payload in the data packet. The payload data thus does not include the associated meter data including the meter identification number, unit of measurement and the measuring resolution. Common to all of the associated data is that the data is related to configuration parameters of the meter, which are substantially static and thus only changes if the meter is intentionally reconfigured. This is contrary to the payload data comprising consumption data that inherently changes over time.

BRIEF DESCRIPTION OF THE FIGURES

The method, devices and communication protocol according to the invention will now be described in more detail with regard to the accompanying figures. The figures illustrates ways of implementing the present invention and is not to be construed as being limiting to other possible embodiments falling within the scope of the attached claim set.

DETAILED DESCRIPTION OF AN EMBODIMENT

The invention can be implemented by means of hardware, software, firmware or any combination of these. The invention or some of the features thereof can also be implemented as software running on one or more data processors and/or digital signal processors. The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Figure 1:
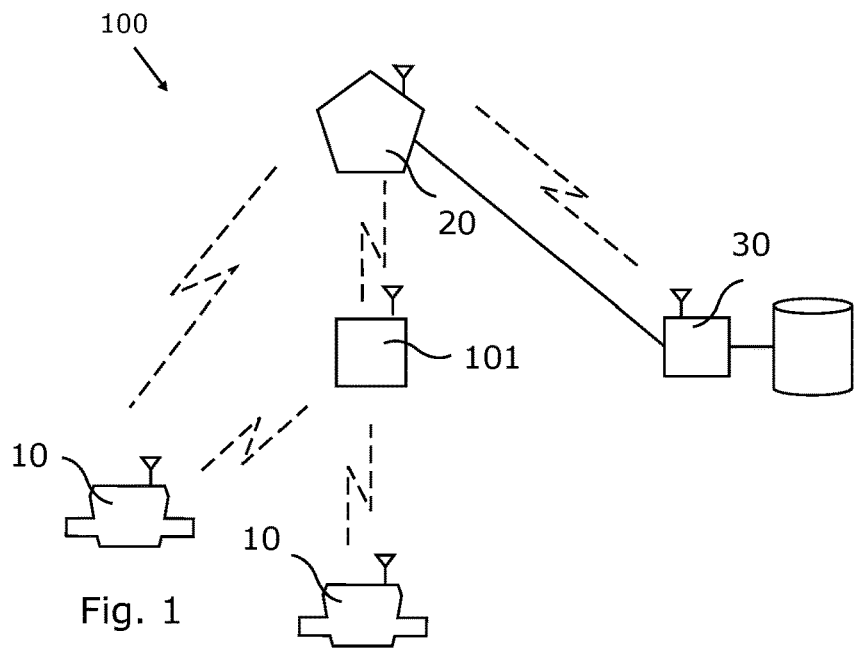
FIG. 1 illustrates a meter reading system.

Referring to FIG. 1, a radio frequency communication system 1 in the form of a meter reading system is illustrated. The meter reading system comprises a plurality of meter devices 10 installed at respective points of use, configured for transmitting data packets to a receiver 30 via radio frequency communication. In the shown exemplary meter reading system, the receiver is implemented as part of a backend system. The meter reading system further comprises one or more collector devices 20 for communicating with the meter devices via radio frequency (RF) communication, and depending on the geographical distribution of the meter reading system, a number of repeater devices 101 may be included to relay data packets from the meter devices to the one or more collectors. From the collector devices, 20 data packets are transmitted to a backend system 30 either wirelessly or via a cabled connection. Additionally, in an alternative system configuration, a number of mobile collection devices (not shown) may be included in the system as an alternative or supplement to the fixed collector devices. In a one-way communication configuration, the meter devices are dedicated transmitter devices configured for transmitting data packets to the receiver via the collector devices, and in a two-way communication configuration, each of the meter devices, the collector devices and backend system are configured to both transmit and receive data packets.

It is understood by the skilled person that other network devices such as router devices or meter devices equipped with different communication modules may also be included in the above described meter reading system. At least communication between meter devices and collector and/or repeater devices is based on RF communication, whereas the transmissions between collector devices and the backend system may be of any suitable type, such as wired or wireless. Further, it is understood by the skilled person that the shown meter reading system only includes a limited number of network components for illustrative purposes.

Figure 3:
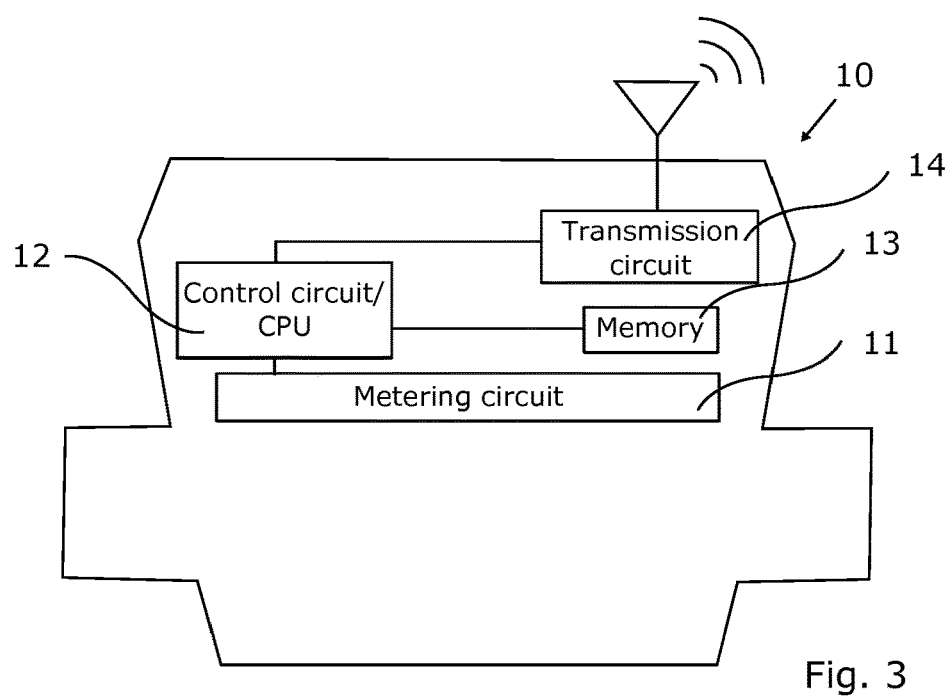
FIG. 3 illustrates a meter device.

Referring to FIG. 3, each meter device 10 comprises measuring means including a metering circuit 11 configured to measure the amount of a specific utility, such as water or electricity, delivered to the respective point of use via the utility network. Based on the measurements, consumption data CD is computed and stored in a register of a memory 13 of the meter device. In addition to flow and actual consumption data, the consumption data may also include other kinds of data related to measurements performed by the metering circuit or related to the operation of the meter device, such as aggregated flow, flow rate, leakage indication, tamper alarms, ambient temperature. Consumption data in it broadest sense could also encompass measurement performed by other sensors integrated in the meter device or sensors operating as independent devices. In another embodiment (not shown) the meter device may thus be a device for sensing a parameter other than flow and/or the amount of a utility delivered to a point of use.

Depending on the type of consumption data, the data is stored in different registers of the memory 13. The memory 13 also stores associated meter data AMD reflecting the configuration parameters of the meter device. For example, the associated meter data specifies which registers of the memory should be used as input for the data packets generated by the meter device, as will be further described below. The associated meter data also includes information about the unit of measurement and the resolution of the data in the register that is used as input for the generated data packets. The associated meter data AMD is thus data that is necessary to interpret or codify the consumption data CD. Without knowing the associated meter data, the consumption data thus cannot be used.

The memory 13 of the meter device further stores a data encryption keys DEK. The data encryption key(s) may be store at the time of initial configuration of the meter or loaded into the meter memory at a later stage, e.g. during an update-session or re-configuration.

Figure 2:
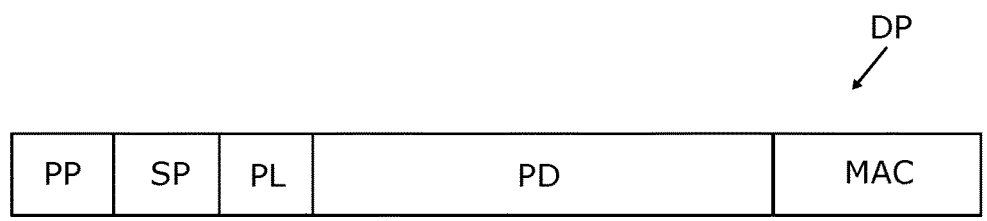
FIG. 2 show diagrams illustrating radio packets.

During operation, a processing unit 12 of the meter device is configured to generate data packets DP including the consumption data CD as the only payload data, as shown in FIG. 2. In addition to the payload, the data packets include overhead data or redundancy data comprising a message authentication code MAC. The message authentication code MAC is computed by the processing unit 12 based on a MAC-algorithm using the payload data PD, the associated meter data AMD and the data encryption key DEK, as input. The overhead data further includes a packet preamble portion PP, a synchronization portion SP, a packet length field PL. The overhead data also includes information about the actual time of the data packet and the identity of the meter. The data packets thus does not include the associated meter data necessary to interpret the consumption data. For the recipient to make use of the data, the associated meter data must thus be made available by other means, such as by prior configuration. By omitting the associated meter data, the size of the payload of a data packet is substantially reduce, such as by 30-50%. As the payload accounts for approximately half the actual packet size, omission of the associated meter data may reduce total data packet size about 25%, which again may lead to considerable reductions in transmission power.

Further, the meter device further comprises a transmission circuit 14 including an antenna for transmitting the data packets to a receiver of the meter reading system. The receiver may be implemented in one or more of the collector devices 20 or as part of the backend system 30. In the case of a backend implemented receiver, all meter device of the meter reading system are assigned to the same receiver. In an embodiment wherein the receivers are implemented in the collectors, the meter devices are divided into sub-groups and assigned to different collector devices. Further, in one configuration the transmission circuit and antenna may additionally be configured for operating as a receiver for receiving data packets from the backend system and the collector devices.

The receiver 20, 30 comprises an associated memory storing data encryption keys and associated meter data for each of the meter devices assigned to it. As the associated meter data may change over time, for example if a meter is replaced or reconfigured, the memory of the receiver stores a set of current associated meter data CAMD, that is considered to be the current valid associated meter data. The receiver is also provided with a processing unit controlling its operation and configured to execute the MAC-algorithms also applied by the meter devices.

When a data packet is received by the receiver, the receiver is configured to determine whether the data packet is a valid data packet transmitted from a trusted meter device and whether the data contained in the data packet has been compromised during transmission. To this end the receiver is configured to perform a primary authentication check of a received data packet (hereinafter the first data packet DP1). This is done by the processing unit recalculating the message authentication code of the first data packet (hereinafter the first message authentication code MAC1) by running the MAC-algorithm using the payload data PD included in the first data packet and the stored data encryption key DEK and current associated meter data CAMD for the respective meter, as input. If the recalculated first message authentication code is identical to the first message authentication code received with the first data packet, the first data packet is considered authentic and accepted as valid.

By performing the authentication check using the stored current associated meter data CAMD, in addition to determining the authenticity of the full data packet, the receiver also validates the stored associated meter data. Thus, without actually receiving the associated meter data, the receiver ensures that the associated meter data used to interpret the received consumption data is correct. If the associated meter data used by the meter device to generate the message authentication code is different from the current associated meter data stored by the receiver, the primary authentication check will fail.

If the first data packet is not considered authentic during the primary authentication check, the first data packet is subject to a further check to fully determine validity. Potential tampering or other fraudulent activities may cause a failed primary authentication check. However, as described above, the authentication check may also fail if the current associated meter data stored by the receiver is different from the associated meter data stored in the meter device.

Thus if the primary authentication check fails, a secondary authentication check is performed on the first data packet DP1. For this purpose a plurality of alternative sets of associated meter data AAMD are stored in the memory of the receiver. The alternative sets of associated meter data AAMD reflect a limited number of possible meter configurations, such as 10-100 different configuration setups. The secondary authentication check includes recalculating the first message authentication code using the received payload data PD, the data encryption key DEK and the alternative sets of associated meter data AAMD as input for the MAC-algorithm. If one of the alternative sets of associated meter data AAMD results in a match between the recalculated message authentication code and the received message authentication code, the first data packet is considered potentially authentic. Thus, if a match for the first message authentication codes is found, the first data packet is considered temporarily valid and stored in a cache memory of the receiver. The receiver further caches the set of alternative associated meter data set used to deem the first data packet potentially authentic (in the following referred to as the matching associated meter data MAMD).

The receiver then awaits the reception of the next data packet from the meter device (hereinafter the second data packet DP2). The second data packet is generated at the meter device exactly as the first data packet. As the second data packet is generated at a later point in time, the payload data PD and the message authentication code included in the second data packet has changed. The second data packet thus includes payload data PD2 and a second message authentication code MAC2.

Receiving the second data packet, the receiver first performs the primary authentication check on the second data packet similar to the primary authentication check performed on the first data packet, as described above. If second data packet is considered authentic following the primary authentication check, i.e. based on the current associated meter data, the current associated meter data CAMD stored in the receiver is considered valid and the second data packet is accepted as valid. The cached first data packet on the other hand is then rejected as invalid.

If second data packet is not considered authentic following the primary authentication check, the receiver performs a tertiary authentication check. The tertiary authentication check includes checking the second message authentication code MAC2 using the received payload data PD2, the data encryption key DEK and the matching associated meter data MAMD as input for the MAC-algorithm. If the matching associated meter data MAMD also results in a match for the second message authentication code MAC2, the receiver accepts both the first and the second data packets as authentic. However, if using the matching associated meter data MAMD as input for the MAC-algorithm does not result in a match, i.e. a value equal to the second message authentication code, both the first data packets are rejected.

By using this method, it is ensured that the current associated meter data CAMD is not updated before at least two consecutively received data packets are considered authentic using the same set of associated meter data AMD. This has the advantageous effect that the strength of the MAC is not weakened by the process in the secondary authentication where a number of different sets of associated data AMD are used for the calculations. The strength of the MAC is understood as the probability that when applying the MAC algorithm a change of the authenticated or associated data will be detected. Thus for a MAC with a high strength the probability of detecting a change of data is very high.

The ratio of weakening the MAC in the secondary authentication alone would potentially equal the number of alternative sets of associated meter data AAMD. If the number of alternative associated meter data AAMD equals 16 the strength of the MAC will be weakened by a factor of 16 which equals reducing the length of the MAC by 4 bits. Thus if the method would accept a new set of associated meter data based solely on the secondary authentication check the strength of the authenticity check of the system would be less than the inherent strength of the MAC defined by the number of bits in the MAC. Moreover, the weakening would be variable depending on the number of alternative sets of associated meter data AAMD, thus the strength of the authentication and integrity of the received data would not be well defined.

Including the tertiary authentication check using only one set of associated data (the matching associated meter data MAMD) for the authenticity check of a new set of payload data PD2, will have the inherent strength of the MAC defined by the number of bits in the MAC. The combined strength of the secondary authentication and the tertiary authentication can thus never be less than the inherent strength of the MAC as defined by the number of bits in the MAC.

It is understood by the skilled person that other parts of the data packet than the payload data PD, the associated meter data AMD and the data encryption key DEK may be included in the calculation of the MAC if protection of these other parts is desired. Such other parts may be but not limited to one or more elements of overhead data such as meter identification, packet length, packet type or time information. Further, if the MAC calculation is based on cryptographic methods, such as the AES algorithm or other suitable encryption algorithms, these cryptographic methods may include an initialization vector. Data elements to be protected may be included in such an initialization vector. Especially inclusion of the time or a continuous incrementing counter in the initialization vector may be beneficial to prevent replay of packets.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. In addition, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for wirelessly transmitting data packets from a meter device to a receiver of a meter reading system, the method comprising the steps of:
    generating at the meter device, a first data packet including consumption data as payload data and a first message authentication code computed based on a message authentication code algorithm using as input the payload data, associated meter data, and a data encryption key stored in a memory of the meter device; wherein the associated meter data is data reflecting one or more configuration parameters of the meter device;
    transmitting the first data packet from the meter device to the receiver;
    at the receiver, performing a primary authentication check of the received first data packet and verifying current associated meter data stored in a memory of the receiver by recalculating the first message authentication code based on the message authentication code algorithm with the received payload data, the current associated meter data, and the data encryption key stored in a memory of the receiver, as input; and
    accepting the first data packet if it is verified as authentic.

2. A method according to claim 1, wherein if the first data packet is not accepted during the primary authentication check, the method further comprises the steps of:
    performing a secondary authentication check of the first data packet at the receiver by recalculating the first message authentication code using the received payload data, the data encryption key, and a plurality of different sets of associated meter data stored in the memory of the receiver, as input for the message authentication code algorithm;
    storing the first data packet in a cache memory of the receiver, if one of the plurality of different sets of associated meter data results in a match for the first message authentication code;
    generating a second data packet at the meter device, including consumption data as payload data and a second message authentication code, and transmitting the second data packet, DP2, from the meter device to the receiver;
    performing tertiary authentication check of the second data packet at the receiver by recalculating the second message authentication code using the MAC-algorithm with the payload data, the data encryption key, and the associated meter data identified during the secondary authentication check, as input; and
    accepting the first and the second data packets as authentic if the recalculation results in a match for the second authentication code.

3. A method according to claim 1, wherein the one or more configuration parameters of the meter device are one or more of a unit of measurement, data resolution or an indication of a memory register to be used as input for the consumption data.

4. A method according to claim 1, wherein the current associated meter data is updated if the first and the second data packets are accepted as authentic during the tertiary authentication check.

5. A method according to claim 1, wherein the current associated meter data is initially inputted into the cache memory of the receiver in connection with the initial installation of the meter device in connection with re-calibration of the meter device.

6. A method according to claim 1, wherein the payload data and the message authentication codes of the data packets are encrypted by the meter device before transmission and subsequently decrypted by the receiver.

7. A meter device for measuring a flow rate of a fluid or for sensing another parameter, the meter device comprising:
    a processor configured to compute consumption data based on flow rate measurements or a sensed parameter; and
    a transmitter for transmitting data packets via radio frequency communication;
    wherein the processor is further configured to perform the steps of generating and transmitting the data packets, according to the method described in claim 1.

8. A receiver for receiving a data packet transmitted by a meter device, the receiver comprising:
    a memory; and
    a processing unit configured to perform the steps of receiving the first data packet, performing the primary authentication check of the received first data packet, and verifying the current associated meter data according to the method described in claim 1.

* * * * *